O. N. MOORE.
FARE REGISTER.
APPLICATION FILED SEPT. 7, 1909.

1,171,625.

Patented Feb. 15, 1916.
9 SHEETS—SHEET 1.

Witnesses
Frank A. Fahl
Thomas W. McMeans

Inventor
Otto N. Moore,
By Bradford Hood
Attorneys

O. N. MOORE.
FARE REGISTER.
APPLICATION FILED SEPT. 7, 1909.

1,171,625.  Patented Feb. 15, 1916.
9 SHEETS—SHEET 2.

Witnesses
Frank A. Fahle
Thomas W. McMeans

Inventor
Otto N. Moore,
By Bradford Wood
Attorneys

O. N. MOORE.
FARE REGISTER.
APPLICATION FILED SEPT. 7, 1909.

1,171,625.

Patented Feb. 15, 1916.
9 SHEETS—SHEET 6.

Witnesses
Frank A. Fahle
Thomas W. McMeans

Inventor
Otto N. Moore,
By Bradford Hood
Attorneys

O. N. MOORE.
FARE REGISTER.
APPLICATION FILED SEPT. 7, 1909.

1,171,625.

Patented Feb. 15, 1916.
9 SHEETS—SHEET 8.

Witnesses
Frank A. Fahly
Thomas W. McMeans

Inventor
Otto N. Moore,
By Bradford Hood
Attorneys

UNITED STATES PATENT OFFICE.

OTTO N. MOORE, OF INDIANAPOLIS, INDIANA, ASSIGNOR TO OHMER FARE REGISTER COMPANY, OF ROCHESTER, NEW YORK.

FARE-REGISTER.

1,171,625. Specification of Letters Patent. Patented Feb. 15, 1916.

Application filed September 7, 1909. Serial No. 516,470.

*To all whom it may concern:*

Be it known that I, OTTO N. MOORE, a citizen of the United States, residing at Indianapolis, in the county of Marion and State of Indiana, have invented certain new and useful Improvements in Fare-Registers, of which the following is a specification.

In the operation of fare registers in interurban cars it is very desirable that a record strip be produced in such form that an auditor may, by inspection thereof, accurately and quickly determine the number of cash and ticket fares collected by a conductor between any two stations; the amount of each fare, (at least of each cash fare), thereby determining the destination of the passenger; whether or not the fare was paid in cash or by ticket; the direction of travel, and the point at which any given fare entrained; and an indication of the particular conductor making the collection. To this end I have produced a mechanism which, in conjunction with fare registering mechanism, will operate to produce such a record as had been described and, in order to insure a proper actuation of the accumulating mechanism I have provided improved mechanism for positively actuating such accumulating mechanism.

My invention further comprises means for automatically actuating a registering mechanism by a motor operable from power carried by the car, as distinguished from a manual operation, the motor being, in the present case, one operated by means of the compressed air already available in the brake mechanism.

My several improvements have been especially designed for use in conjunction with that type of fare register illustrated in my Patent No. 845,882 but is applicable to other forms of registers.

The accompanying drawings illustrate my invention.

In the drawings similar reference characters will apply to the same parts and, whenever practicable, the reference characters used in the above mentioned patent will be used herein to indicate corresponding parts, thus facilitating a reference to said patent for details of construction necessary for the production of a complete machine.

Mounted in the main frame or casing of the machine is an indicator wheel 38, the face of which is divided into ten equal spaces marked "0" and "5" alternately (where the fare unit is five cents) and this indicator wheel is carried by a shaft 37 provided with a pinion 36 meshing with a pinion 35 carried by a shaft 34. Shaft 34 has secured to it a sprocket wheel 31 which is driven by a chain 28 or any other suitable means. Sleeved upon shaft 34 and driven by a sprocket chain 29 or other suitable means is a sprocket wheel 31' which connects with and drives a gear 50 sleeved upon shaft 34 and meshing with a gear 51 sleeved on shaft 37 and connected with a dollar indicator wheel 53. The chains 28 and 29 may be suitably operated in any way, as for instance by mechanism such as set forth in my aforesaid patent but not necessary to be described in detail here. Journaled upon shaft 37 between the two indicator wheels 38 and 53 is a "tens" indicator wheel 44 which is connected by gears 39, 40, 42, and 43 with the indicator wheel 38 so that each alternate step of the wheel 38 will cause a corresponding step of the wheel 44.

Figure 8:
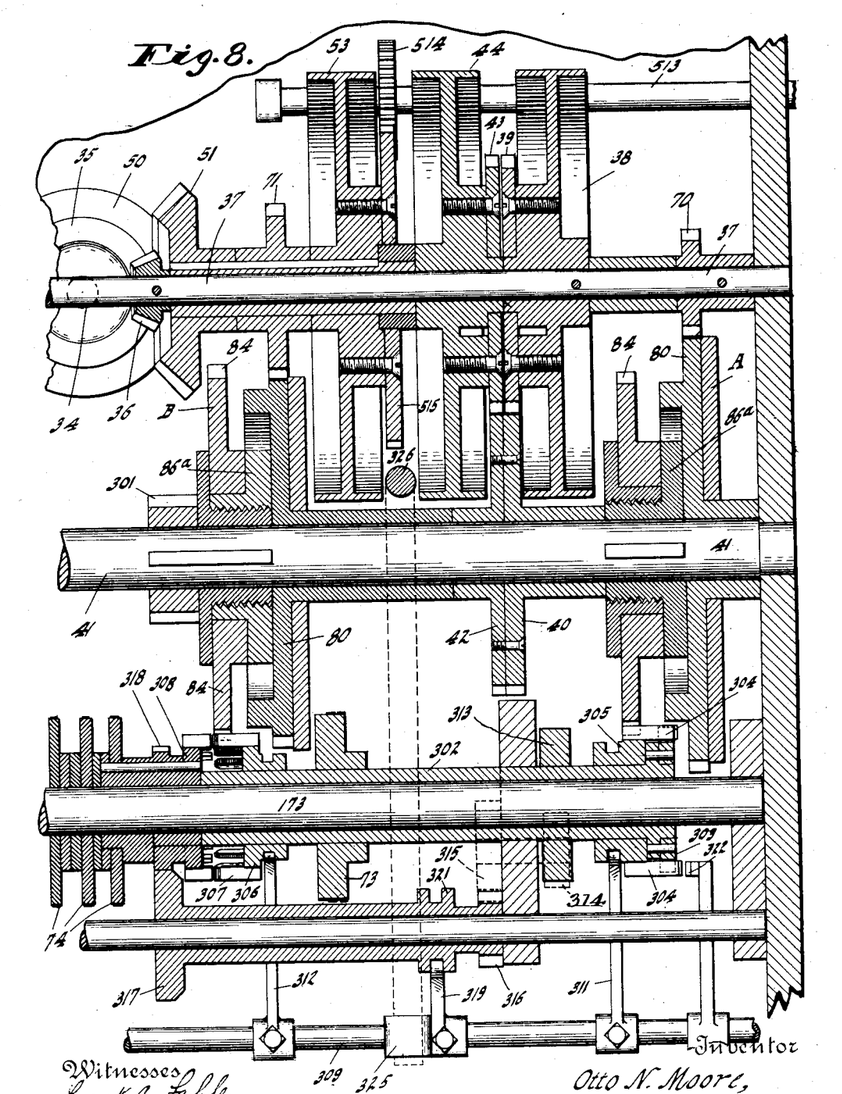
Fig. 8 a sectional detail through the axes of the several parallel shafts shown in Fig. 6, the said shafts being shifted from actual position into a single plane as indicated by the line 8 8.

Secured to shaft 37 is a pinion 70 which meshes with the master gear 80 of a "cents" actuator A which is substantially identical with the actuator A described in the above mentioned patent. This "cents" actuator, as well as the "dollars" actuator B, (the master gear 80 of which meshes with the pinion 71 attached to the indicator wheel 53), comprises a gear 84 which is capable of rotation relative to the master gear 80 and carries a dog 85 (see dotted lines in Fig. 6) adapted to form a driving connection between the master gear 80 and the gear 84 in conjunction with the member 86ª which coöperates with the dog 85 and the master gear 80 in the manner of coöperation between the segment 86 and the master gear 80 of the actuator described in the patent referred to. In the patented structure, however, the segment 86 was loose upon its shaft 41 and each of the segments was driven by a swinging arm and connecting link. In the present construction, each of the members 86ª is keyed to and rotates with the shafts 41, the gear 84 being journaled thereon, as clearly shown in Fig. 8, and shaft 41 is driven by means of a pinion 301. Journaled upon the stationary shaft 173 is a cash-fare multi-unit or "dollars" accumulator 74 comprising the usual units, tens and hundreds wheels used to indicate dollars. Also journaled around said shaft is a units or "cents" accumulator 73 for indicating fare amounts less than one dollar. These parts correspond to the similarly indicated parts in my patent already mentioned, in which the connection between each actuator and its accumulator was a pawl and ratchet. Such a connection was entirely satisfactory where the mechanism was operated below a certain speed but could be "thrown by" by an excessively heavy sudden actuation. In order to avoid this difficulty, therefore, and insure, beyond question, the accurate operation of the accumulators wholly irrespective of speed of operation, I have provided mechanism by means of which the accumulators are positively connected to the actuators during accumulating actuation. For this purpose I sleeve upon shaft 173 a tubular shaft or sleeve 302 to which is secured, at one end, a clutch member 303 having teeth adapted to receive the axially-extended teeth 304 of a gear 305 mounted loosely upon sleeve 302 and capable of both longitudinal and relative rotative movement thereon, the construction being such that by shifting the gear 305 axially on sleeve 302 the teeth 304 may be drawn into or out of engagement with the clutch 303 but will at all times remain in mesh with the teeth of gear 84 of the "cents" actuator A. Secured to the tubular shaft 302 is the units or "cents" accumulator 73 already referred to. Journaled upon the sleeve 302 (or directly upon the shaft 173 if the sleeve be shortened) is a gear 306 which is longitudinally movable on said sleeve as well as rotatable thereon and is provided with axially-extended teeth 307 adapted to mesh with the teeth of the gear 84 of the "dollars" actuator B and also to be brought into engagement with a clutch member 308 connected to the units element of the multi-unit or "dollars" accumulator 74, the arrangement being such that gear 306 may be shifted axially to bring its teeth 307 into or out of engagement with the teeth of the clutch 308, the teeth 307 however remaining at all times in mesh with the teeth of the gear 84 of actuator B. In order that gears 305 and 306 may be alternately brought into and out of engagement with their respective clutch members I provide a shifting bar 309 having fingers 311 and 312 engaging respectively with the gears 305 and 306 so as to shift them simultaneously into opposite positions relative to their clutch members.

In order to transfer to the multiunit or "dollars" accumulator 74 the amounts accumulated by the units or "cents" accumulator 73, I provide the following mechanism. Secured to tubular shaft 302 so as to rotate therewith and so with the "cents" indicator wheel 38, is an intermittent gear 313 adapted to mesh with an idler 314 to produce, during a comparatively short portion of the rotation of the tubular shaft 302, a half rotation of said idler, the gears being of the well known "Geneva" type in order to be locked against actuation except when the teeth are properly meshed. The idler 314 is connected with and rotates the idler 315 which meshes with the pinion 316 connected to a one-tooth intermittent gear 317, which gear meshes with a gear 318 (see dotted lines in Fig. 7) connected to the units element of the multi-units or "dollars" accumulator 74 (Fig. 8), these two gears 317 and 318 being also of the "Geneva" type. In view of the fact that these two gears lock upon themselves to prevent rotation of gear 318 except by a rotation of gear 317 it is necessary, in order for the multiunits or "dollars" accumulator to receive the impression resulting from the setting of the actuator B, for these gears to be disconnected during the time of the accumulating operation of the actuator B and for that purpose I provide the shifting bar 309 with a finger 319 adapted to engage collars 321 carried by the hub of gears 316 and 317 so as to shift said gears longitudinally and throw gear 317 out of mesh with gear 318 at the time when teeth 307 of gear 306 are in engagement with the teeth of clutch 308. The operation of this portion of the mechanism will now be apparent when considered in connection with the mechanism of the previous mentioned patent. By proper rotation of the gears 35 and 50 the cents indicators 38 and 44 will be brought to proper indicating position to indicate any 5-cent interval in a dollar and the indicator 53 will be brought to indicate any desired number of dollars (supposing the mechanism to be designed for United States or Canadian money). The setting of these indicators operates, through gears 70 and 71 upon the master gears 80 of the actuators A and B, respectively, exactly as described in my previous patent and, when shaft 41 is rotated through the medium of pinion 301 the members 86ª of the actuators will, through the coöperating dogs 85, pick up the gears 84 of the actuators A and B at the proper points in the forward and rearward travel respectively so as to drive said gears through an angular distance corresponding to the setting of the indicators, in the manner fully disclosed in the said patent. The operation thus described is identical with the operation of the corresponding parts in the said patent and I do not believe it necessary therefore to go into further detail with respect thereto.

The pinion 301 may be actuated by any desired means and the particular mechanism designed for that purpose in the present instance will be described hereafter. For the present it is sufficient to call attention to the fact that the pinion 301, and therefore the shaft 41, is rotated first in one direction and then in the opposite direction back to initial position.

When the first or forward movement of shaft 41 is made it will drive the element 86ª of the "cents" actuator A in such direction as to engage the dog 85 of the gear 84 of the said "cents" actuator A and rotate it so as to cause a rotation of the gear 305, and this gear, by reason of the engagement of its teeth with the clutch 303, will cause a rotation of the units or "cents" accumulator 73 and a rotation of gear 313. If there has been a sufficient amount previously indicated by the "cents" accumulator 73 so that the addition thereto of the present amount will exceed one dollar the teeth of the gear 313 come in mesh with gear 314, and through gear 315 and pinion 316 cause a complete rotation of gear 417 so as to advance gear 318 a single step thus advancing the units element of the multiunit accumulator 74 a single step, this movement being permitted because clutch 308 lies clear of the teeth 307 of gear 306. While this forward movement of shaft 41 is taking place gear 84 of the "dollars" actuator B is being rotated by dog 85 an amount corresponding to the setting of its indicator 53 and consequently drives the gear 306 a corresponding amount but without affecting the clutch 308. At the end of the forward movement of shaft 41 the sliding bar 309 is quickly shifted, by a mechanism hereafter described, and teeth 304 withdrawn from clutch 303; teeth 307 carried into engagement with clutch 308; and gear 317 shifted out of engagement with gear 318 thus placing the parts in such condition that, when shaft 41 is returned to its initial position, gear 84 of the "dollars" actuator B will drive gear 306 an amount to cause clutch 308 to rotate the initial element of the multiunits element 374 an amount corresponding to the amount indicated by the dollars indicator 53, whereupon, at the end of the return stroke of shaft 41, the shifting bar 309 is again shifted into a reverse direction to return the parts to normal position. It will be noticed that, by this arrangement, the parts are at all times positively interconnected in such way that the accumulating elements can neither be "thrown by" nor retracted but are at all times under positive control and actuation, thus insuring an absolutely accurate accumulation. The clutch member 303 is locked, when teeth 304 are withdrawn therefrom, by means of a locking finger 322 carried by the shifting bar 309.

The shifting bar 309 is shifted by a yoke 325 carried by a rock shaft 326 projected rearwardly and provided at its rear end with an operating lever 327. This lever 327 is normally held in position by means of a spring 328 one end of which is attached to the lever 327 and the other end attached to a lever 329 pivoted upon a stationary support and provided with a pin 330 lying in a vertical notch 331 in the main operating plate 114 which is mounted so as to have reciprocating motion in suitable guides on the main frame of the machine. In order to prevent movement of lever 327, except at the end of the stroke of plate 114, I provide a locking lever 333 having an inverted V-shaped slot 334 therein adapted to receive a pin 335 carried at the lower end of lever 327. The locking lever 333 carries at its end a pin 336 the downward movement of which is prevented (except at the ends of the stroke of plate 114) by a block 337 carried by plate 114. The pivot of lever 329 is substantially in the vertical plane of the axis of the rock shaft 326 and the movement of plate 114 swings said lever 329 to opposite sides of lever 327, as indicated in full and dotted lines in Fig. 3 so that, when lever 329 is carried to said respective positions, spring 328 will at that time tend to swing lever 327 to the positions shown in full and dotted lines respectively in Fig. 3 and this will be prevented except at the ends of the stroke of the plate 114 (to the right and left respectively, as indicated in full and dotted lines in Fig. 3) because, until that time, pin 336 will lie upon block 337.

The actuation of the entire mechanism, with the exception of the means for distinguishing between ticket fares and the cash fares, is dependent upon the actuation of the plate 114. This plate is normally held in the position shown in full lines in Fig. 3 by means of a spring 341 attached to said plate at 342.

The shaft 41 is connected to plate 114 in the following manner. Meshing with pinion 301 is a segment 343 which is journaled upon a shaft 101. This shaft carries an axially shiftable clutch 345 which may be thrown into and out of clutching engagement with the segment 343. Secured to shaft 101 is an arm 346 and a pin 347 is secured to clutch 345 and slides axially through arm 346. Shaft 101 is provided with a beveled gear 127 meshing with a gear 121′ carried by a rock shaft 121 projected through a slot 124 in plate 114 and carrying at its outer end an arm 351. The arm 351 carries a pin 352 lying in a vertical slot 353 in plate 114 (dotted lines Fig. 3) the arrangement being such that reciprocation of plate 114 will produce a rocking of arm 351 and shaft 121. Arm 351 is normally urged to the position shown in full lines in Fig. 3 by means of the spring 354. The clutch member 345 is provided at one end with an opening adapted to receive a pin 355 carried by the segment 343 and at the other end is provided with an opening adapted to receive a pin 356 carried by an arm 357 journaled upon the shaft 101, the arrangement being such that the clutch member 345 may be shifted into and out of connection with segment 343 and correspondingly out of and into connection with arm 357. The clutch member 345 may be shifted by the shifting finger 367 carried by shaft 368, and said shaft carries an arm 369 which parallels plate 114 and is provided with a finger 371 by means of which it may be actuated.

Figure 16:
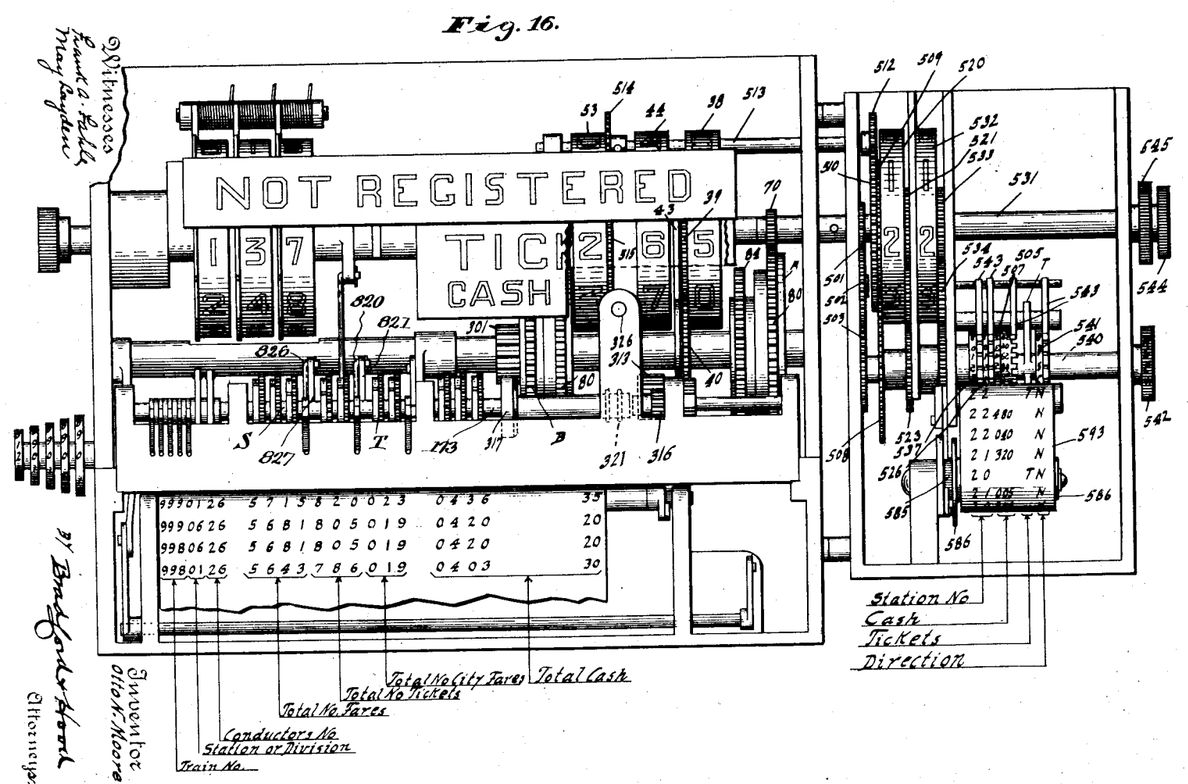
Fig. 16 a front elevation with the front cover removed.
Figure 17:
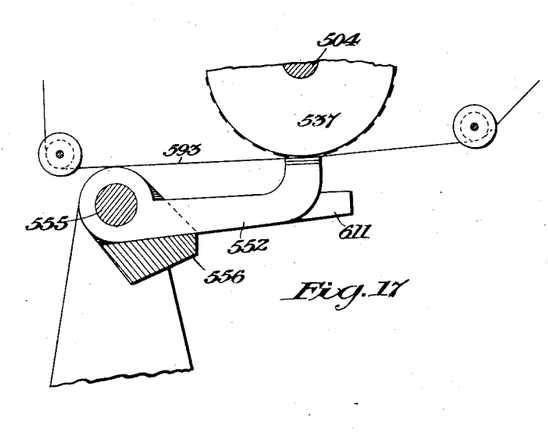
Fig. 17 a detail of the hammer mechanism.

The arm 357 is connected by a link 820 (see Figs. 6, 9, and 16) to the operating arm 821 of a ticket accumulator T, which is conveniently of the type described in my aforesaid patent and so need not be described in detail here. The arm 821 is moved to produce an operation of the ticket accumulator when the clutch 345 is in engagement with the pin 356, and then only.

Figure 9:
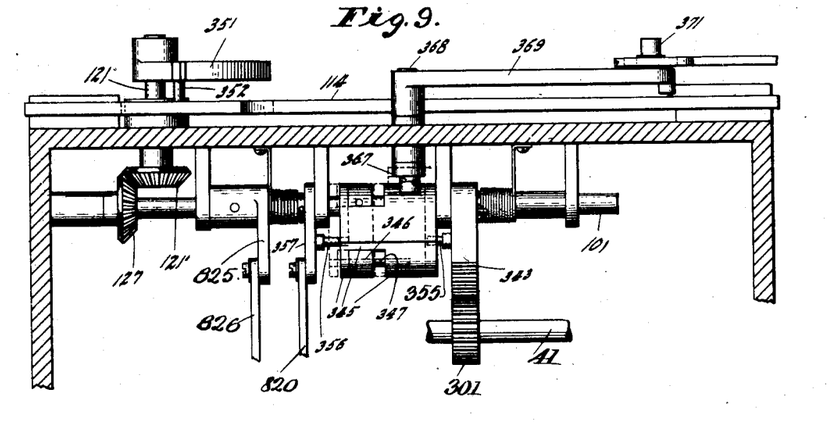
Fig. 9, a detail of the main clutch and associated parts.
Figure 10:
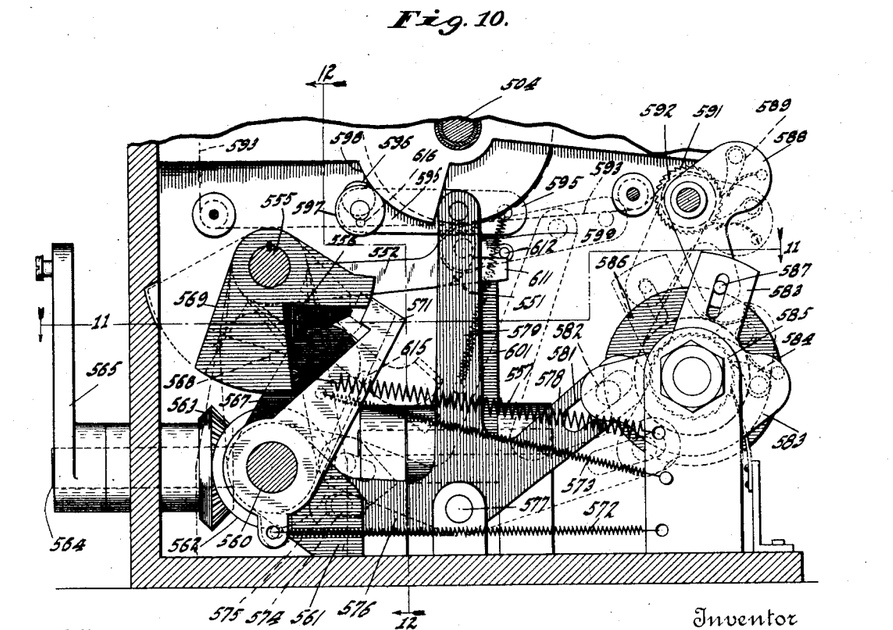
Fig. 10 an enlarged section on line 10—10 of Fig. 1.
Figure 11:
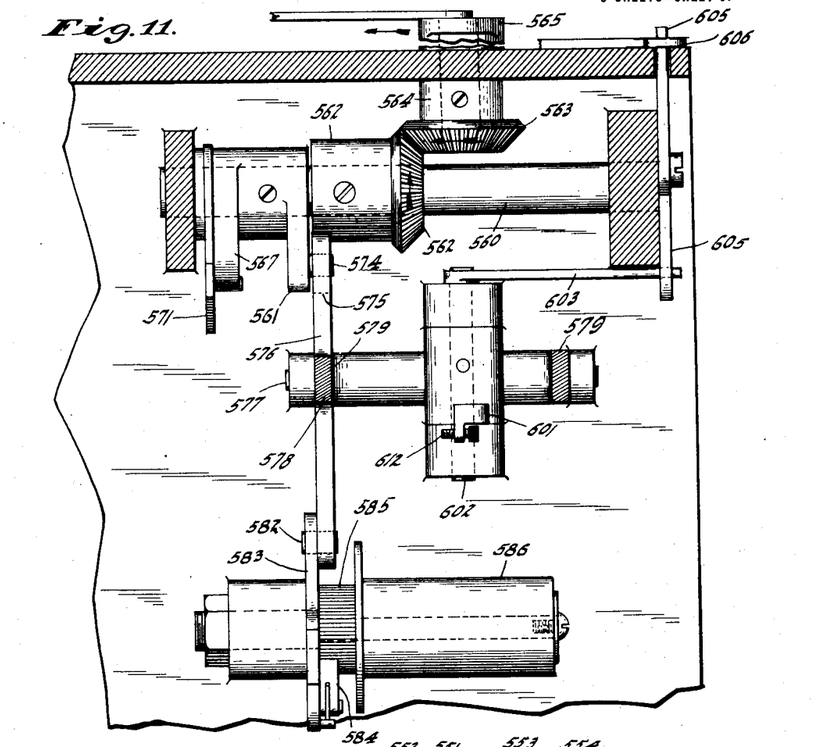
Fig. 11 a section on line 11—11 of Fig. 10.
Figure 12:
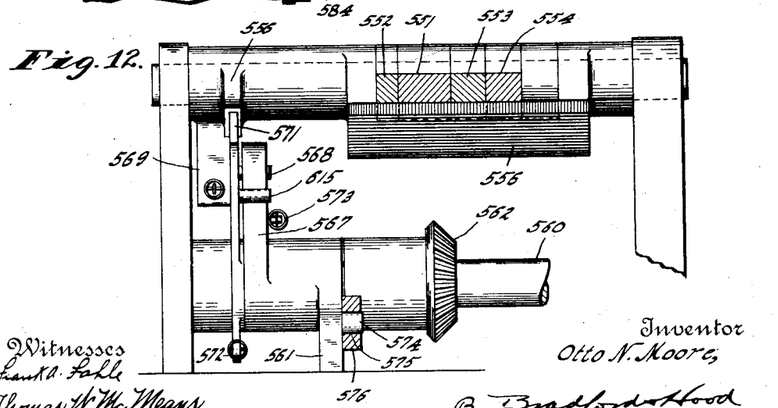
Fig. 12 a section on line 12—12 of Fig. 10.

In case it is desired, as it frequently is, to keep a record of the total number of fares—that is, the sum of the cash fares and the ticket fares—an arm 825 may be fixed on the shaft 101, as clear from Fig. 9. This arm 825 is similar to the arm 357, save that it is fixed on the shaft 101 instead of being loose thereon; and is connected by a link 826, similar to the link 820, to the operating arm 827 of a total fare accumulator S, which may be of the same general type as the ticket accumulator T. The total fare accumulator S is thus actuated for every operation of the shaft 101, and so for every operation of the plate 114.

Figure 4:
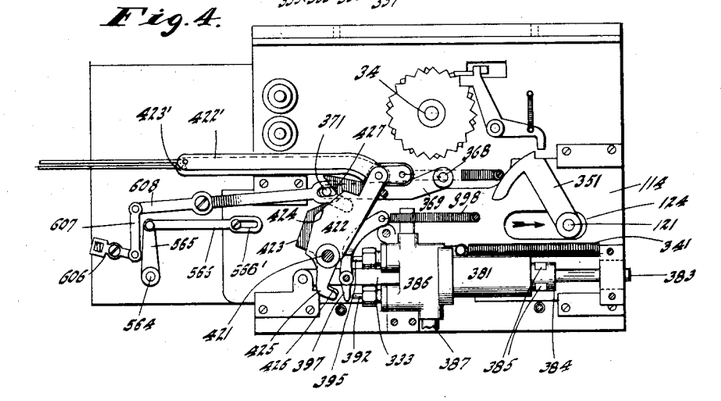
Fig. 4 a rear elevation with the motor attached.
Figure 5:
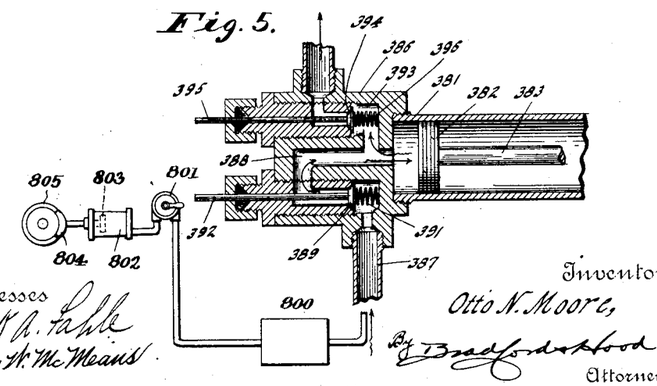
Fig. 5 a sectional detail of the valve for the motor, also showing diagrammatically the air connections of the motor to the air brake system.

Plate 114 may be reciprocated by any desired means but for convenience I deem it advisable to provide a motor of some character so as to relieve the collector from the strain of repeated actuation of the mechanism, such actuation requiring a considerable force. Any suitable mechanical motor might be arranged for the actuation of plate 114 but I believe that the most convenient form is one utilizing the compressed air of an air brake system and I therefore provide an air motor 381 to drive the plate 114 in the direction indicated by the arrow in Fig. 4, that being the opposite direction to the direction of action of the spring 341. The motor 381 is provided with a piston 382 having a piston rod 383 carrying a yoke 384 adapted to receive a pair of fingers 385 carried by plate 114. For the purpose of controlling the action of the motor I provide a valve structure 386 illustrated in Figs. 4 and 5. In this structure an inlet pipe 387 is connected to any suitable source of supply of compressed air, such for instance as the main pressure tank 800 of the air brake system of the car; Fig. 5 shows diagrammatically one such system, with a control valve 801 controlling the supply of air to a brake cylinder 802 the piston 803 in which operates a brake shoe 804 acting on a car wheel 805. A passage 388 forms a communication between the inlet and the cylinder of the motor and at an intermediate point in this passage I arrange an inlet valve 389 which is held normally closed by a spring 391 or otherwise, the stem 392 of said valve projecting through a suitable packing gland. Also communicating with the passage 388 is an outlet passage 393 having an exhaust valve 394 arranged therein, the stem 395 of said valve projecting through a suitable packing gland to a point closely adjacent the projecting end of stem 392. The valve 395 is normally urged to closed position by a spring 396. Pivoted near the projecting ends of stems 392 and 395 is a lever 397 normally urged in one direction by a spring 398 in such a way as to engage stem 395 and normally hold the exhaust valve 394 open. For the purpose of controlling the two valves 389 and 394 and at the same time determining the position of lever 369, so as to cause a registration of either a cash fare or ticket fare upon the proper accumulator I pivot upon the stud 421 a pair of levers 422 and 423. The lever 422 is provided with a cam surface 424 adapted to engage pin 371 so as to raise lever 369 to the position shown in Fig. 4, in which position clutch 345 will be shifted so as to engage pin 355 of arm 357 and thus connect the ticket accumulator T, shown in Fig. 16. Lever 422 is also provided with a finger 425 adapted to engage lever 397 so as to swing the same into engagement with stem 392 so as to open the inlet valve 389 and permit the exhaust valve 394 to close. Lever 423 is provided with a finger 426 the same in form and function as finger 425. Lever 423 is also provided with a cam notch 427 adapted to engage pin 371 and throw the same downward so as to shift the clutch 363 to bring it into engagement with pin 345 and thus connect segment 343 with shaft 101. The members 422 and 423 will be provided with suitable operating members 422' and 423' respectively which are extended, conveniently as ropes or cords, throughout the length of the car for convenient access by the collector.

The mechanism for producing an auditor's record indicating the value of each fare collected, at least of each cash fare, and for indicating the station at which the fare entrained, the collecting conductor, and the character of fare, i. e., cash or ticket, is illustrated in Figs. 1, 2, 10, 11 and 12. Secured to the end of shaft 37 is a pinion 501 which meshes with an idler gear 502 which in turn meshes with a gear 503 secured to a shaft 504 which carries a type wheel 505 having upon its face 20 characters (where the decimal money system is used and five cents is the fare unit), so that the type wheel 505 moves with the "cents" indicator wheel 38. Sleeved upon shaft 504 is a sleeve or hollow shaft 506, to one end of which is secured a type wheel 507 having characters 0 to 9, and to the other end of which is secured an intermittent gear 508 meshing with a gear 509 which is connected with gear 510. Gear 510 is journaled upon a shaft 511 and meshes with a gear 512 carried by a shaft 513 which shaft is provided with a gear 514 meshing with a gear 515 secured to the "dollars" indicator wheel 53, so that the type wheel 507 moves with such "dollars" indicator wheel. Shaft 511 has its inner end conveniently journaled in the adjacent end of pinion 501 and secured to said shaft is an indicator wheel 520 having numerals from 1 to 9 inclusive thereon. Secured to wheel 520 is a gear 521 meshing with an idler 522 which meshes with a gear 523 secured to one end of sleeve 524, journaled on sleeve 506.

Secured to sleeve 524 is a type wheel 526 carrying type from 0 to 9 inclusive. Sleeved upon shaft 511 is a hollow shaft or sleeve 531, to one end of which is secured an indicator wheel 532 having numerals 0 to 9 inclusive thereon and having a gear 533 secured thereto. Gear 533 meshes with an idler 534 which meshes with a gear 535 carried by a sleeve 536 journaled upon sleeve 524. Secured to sleeve 536 is a type wheel 537 having numerals 0 to 9 thereon. Journaled upon shaft 504 is a sleeve 540 provided on its inner end with a type wheel 541 which may conveniently carry letters A B C, etc., or other suitable designating characters to designate collecting conductors and secured to the outer end of sleeve 540 is an operating head 542 labeled to correspond with the type wheel 541. The several type wheels 505, 507, 526, 537, and 541 may be provided with suitable ratchets adapted to be engaged by pawls 543 adapted to insure their proper positioning. Secured to the outer end of shaft 511 is an operating head 544 and secured to the outer end of sleeve 531 is an operating head 545. Arranged in alinement with the peripheries of the several type wheels at their printing position is a type T which is a convenient designation for ticket fares. Lying beneath the type wheels 505 and 507 is a hammer 551; beneath wheels 526 and 537 is a hammer 552; beneath type T is a hammer 553 and beneath type wheel 541 is a hammer 554, said several hammers being pivotally supported on a shaft 555 and normally urged upward by means of a yoke 556, driven in one direction by a spring 557.

Journaled beneath shaft 555 is a shaft 560 which carries an arm 561 and a bevel pinion 562, the pinion 562 meshing with a pinion 563 carried by a shaft 564 journaled in the rear plate in the main frame. Secured to shaft 564 is an arm 565. Attached to the arm 565 is a link 566 connected by a slot and pin connection 566' with the plate 114 so that movement of the plate toward the position indicated by dotted lines in Fig. 3 will cause a rocking of shaft 564 toward the position also indicated by dotted lines in such figure; and vice versa. An arm 567, which is secured to shaft 560, engages a pin 568 carried by an arm 569 carried by shaft 555 so as to swing yoke 556 downward and permit the hammers to drop to the position indicated by dotted lines in Fig. 10. Journaled on shaft 560 is a catch 571 which is adapted to engage yoke 556 when the same reaches its lowest position, the catch being normally urged toward the yoke by means of a light spring 572. Arm 561 is normally held in engagement with the bottom of the casing by means of a spring 573, one end of which is attached to the arm 567, and said arm 561 carries a pin 574, which lies in a slot 575 formed in an arm 576 secured to a shaft 577. Shaft 577 also carries an arm 578 and a pair of arms 579. Arm 578 has a slot 581 formed therein to receive a pin 582 carried by a ratchet arm 583 which is provided with a pawl 584 adapted to engage a ratchet 585 carried by a storage drum 586, the ratchet 585 being connected to the drum 586 by any suitable friction connection. Plate 583 is connected by a pin and a slot connection 587 with a ratchet arm 588 which is connected by a pawl 589 and a ratchet 591 with a feed roll 592. A record strip 593 is carried from a supply roll 594 between the type wheels and hammers and thence over the feed roll 592 to the storage drum 586.

Any suitable means may be used for inking the type wheels, either by way of an interposed ribbon or otherwise; but I prefer an inking mechanism which will not be interposed between the type and the record strip at the time of impression and I therefore pivot upon the upper end of arms 579 a yoke 595 which carries an inked roller 596 at its rear end. The yoke also carries a roller 597 engaging a track 598, the track being substantially concentric with the axis of the type wheel and the roller 597 held in engagement with its track by means of a spring 599, the arrangement being such that the inked roller will not too vigorously engage the type of the type wheels. In order to prevent the actuation of the hammer 553, which coöperates with the ticket indicator T, when a cash fare is being registered, I provide a retaining arm 601. which is carried by a rock shaft 602 provided with a finger 603 which takes into a slot 604 formed in a lever 605. The rear arm of lever 605 projects through the rear plate of the casing and is engaged by a lever 606 connected by a link 607 with a lever 608, which lever is connected to pin 371 so as to partake of the up and down movement thereof, the arrangement being such that when arm 369 is thrown to the position shown in Fig. 3 the retaining arm 601 will lie in position shown in Fig. 1 and thus lie in the path of movement of a finger 609 carried by hammer 553 and thus prevent any upward movement of hammer 553 sufficient to produce an impression of the type T on the record strip. Under some conditions it may be advisable to omit a record of the value of a ticket fare, and in order to do this I provide the hammer 551 with a finger 611 and provide the retaining arm 601 with an adjustable finger 612 which may be projected or withdrawn in such a manner that, when the retaining arm is swung away from the position shown in Fig. 1 so as to withdraw it from the path of movement of finger 609, the finger 612 will or will not be in the path of movement of finger 611.

The operation of the individual portions of the mechanism is probably apparent from the foregoing description, but briefly stated, the complete operation of the mechanism is as follows:—The length of any line is generally divided into a number of principal sections of a length equal to the longest pawl for the smallest fare unit and each time a car reaches such a division point the conductor will turn heads 544 and 545 so as to adjust the indicators 520 and 532, and consequently the type wheels 527 and 537 into a position where the number of the station or point of division will be brought opposite the record strip 593. At the beginning of the trip the conductor will also manipulate head 542 so as to bring his designating characteristic on type wheel 541 opposite the record strip. When a passenger entrains, the type wheels 526, 537 and 541 will have been already set as indicated above. Upon collection of the fare the amount of the fare will be indicated by the proper manipulation of the indicator wheels 38, 44 and 53, in the manner described in my patent already mentioned, and this manipulation will cause a proper setting of the actuators A and B, and at the same time an automatic setting of the type wheels 505 and 507 so as to bring the proper portions into position to produce upon the record strip 593 a record of the amount of the collected fare, in the present apparatus the construction being such that any fare ranging from 5 cents to $9.95 in five cent steps, can be collected, indicated and recorded. If the fare is a cash fare the operator will grasp the operating member 422' and draw the same to the left (Fig. 4) thus swinging the member 422 so as to open the inlet valve 392 of the motor and cause an actuation of plate 114 to the position shown in dotted lines in Fig. 3, the surface 424 of member 422 first, however, coming into engagement with pin 371 so as to swing the retaining arm 601 to the position shown in Fig. 1 and so as to shift clutch 345 to the position shown in full lines in Fig. 9, so as to cause the operation of the plate 114 which occurs immediately subsequently to produce an actuation of the cash fare accumulator shown in Fig. 8, in the manner already described. This operation of the plate 114 will also cause a rocking of shafts 564 and 560 in such manner as to retract the hammers 552, 551, 553 and 554, the yoke 556 being retained in its retracted position, as shown by dotted lines in Fig. 10, by the catch 571. The forward movement of shaft 560 results in a rocking of shaft 577 so as to actuate the feeding mechanism of the record strip, thus bringing a fresh portion of said strip into a coöperative relation with the type wheels, and at the same to cause a swing of arms 579 to the position indicated in dotted lines in Fig. 10, thus drawing the inked roller 596 into engagement with those type of the type wheels in position to produce their record. A pin or guard 616 carried by yoke 595 engages the record strip and prevents it from being touched by the ink roller. The inking mechanism is retracted at the beginning of the return stroke of plate 114. The return movement of plate 114 returns lever 565 to normal and this causes a return movement of shaft 560 and arm 567 is brought into engagement with the pin 615 on catch 571 so as to withdraw said catch and permit yoke 556 to be driven upwardly by the spring 557 so as to drive the hammers into engagement with the type wheels.

The return stroke of plate 114 is accomplished by means of spring 341. As soon as the conductor relieves the operating member 422' spring 398 serves to immediately withdraw the operating lever 397 from the inlet valve 392 and brings the said lever 397 into engagement with the exhaust valve 395.

If a ticket fare has been collected the same actuation of the indicating mechanism is had but the operator will operate the member 423' thus swinging member 423 to open the inlet valve of the motor; after preliminarily bringing surface 427 into engagement with the arm the pin 371 to shift the clutch 345 into engagement with the arm 357 which controls the ticket counter and withdraw said clutch 345 from engagement with the segment 343 which actuates the cash fare accumulator, and to throw the retaining arm 601 to the left (Fig. 1) so as to withdraw it from the path of movement of finger 609 of the hammer 553 thereby permitting said hammer to produce a record which will indicate that a ticket has been received instead of a cash fare. The value of this ticket may be recorded or not, depending upon the position of adjustment of finger 612. The accumulating and counting mechanism of the main body of the register is intended to produce a final record in exactly the same manner as that described in my previous patent. It will be noticed therefore that the auditor is supplied, by my present machine, not only with a totalized record but is also provided with an itemized record showing the collecting conductor, and the character, value and point of entrainment of each fare.

Figures 6, 7:
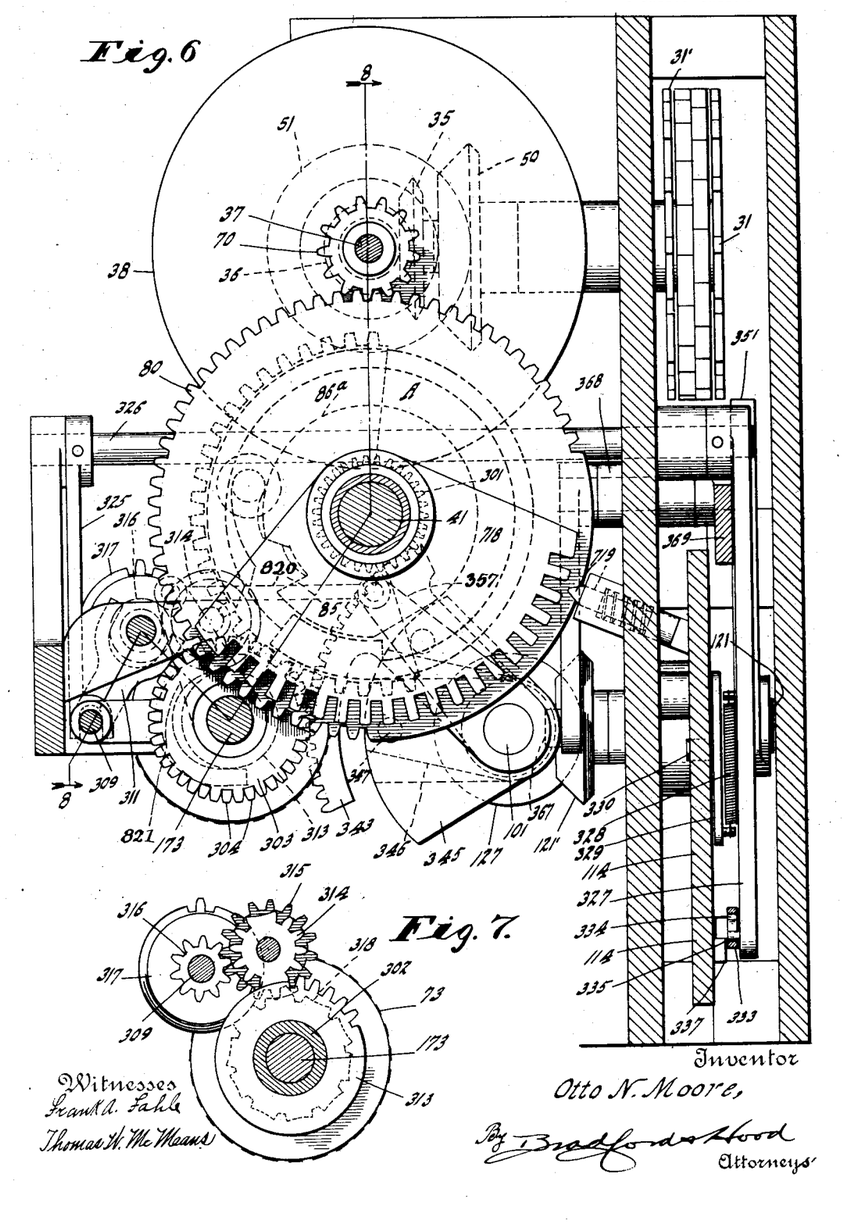
Fig. 6 a vertical section of the accumulator actuating mechanism, the construction being in general substantially like that shown in my before mentioned patent.
Fig. 7 a detail of the transfer mechanism of the accumulator.
Figure 13:
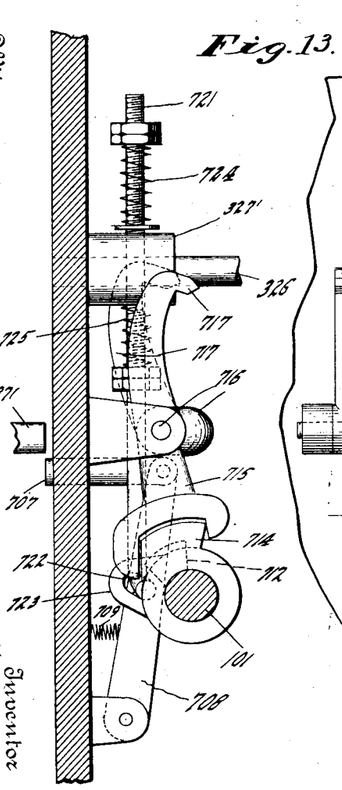
Fig. 13 sectional details of a modified connection between the register and motor.
Figure 14:
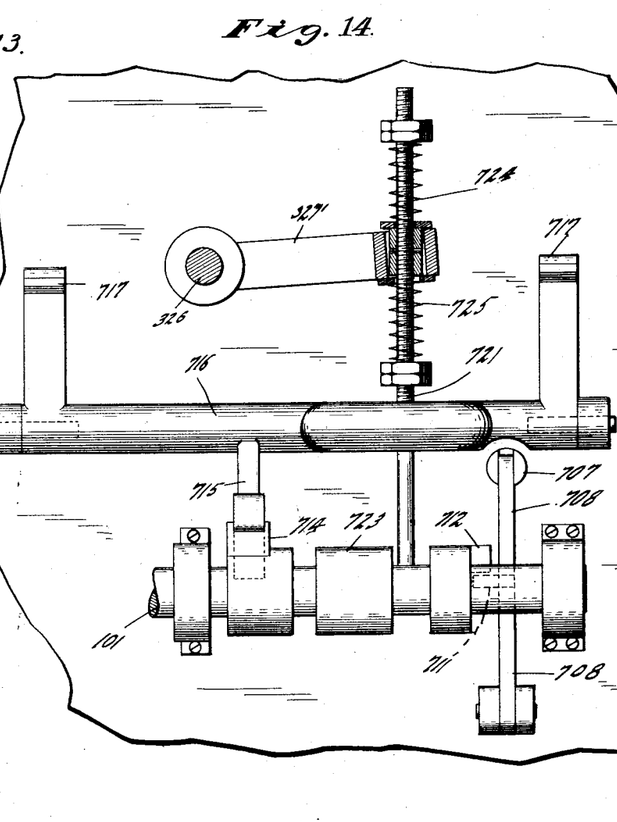
Fig. 14 an elevation of the parts shown in Fig. 13.
Figure 15:
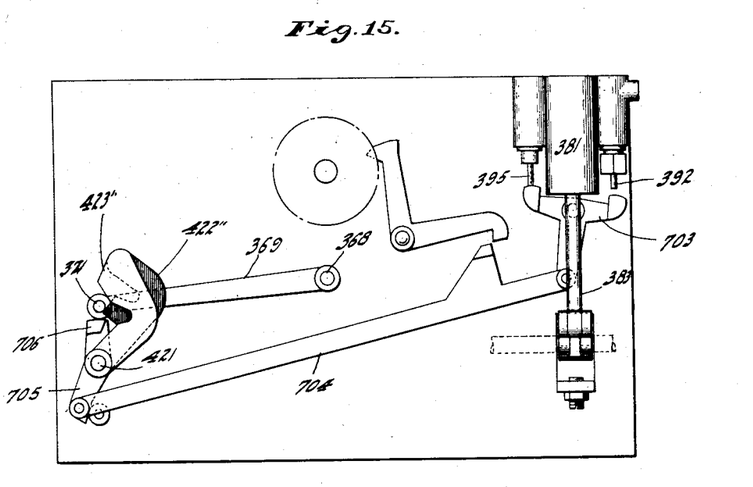
Fig. 15 an elevation of the motor and its controllers for the modified connection.

Instead of the motor mechanism shown in the preceding drawings a simpler construction, such as is shown in Figs. 13, 14 and 15, may be used. In this construction the motor 381 is provided with valve stems 392 and 395 which may be controlled by a lever 703 connected by a link 704 with an arm 705 provided with a shoulder 706 which may be operated by either one of the pair of notched arms 422'' and 423'' substantially identical with the arms 422 and 423 shown in Fig. 4. The arms 422'' and 423'' are adapted to operate against the pin 371 of lever 369 and, in order to hold said pin 371 in either one of its positions during the subsequent actuation of the registering mechanism, I provide a locking pin 707 (Fig. 13) which may be projected into and out of the path of movement of pin 371 by means of a lever 708 which is normally held in the position shown in Fig. 13 by means of a compression spring 709. Lever 708 is provided with a projection 711 adapted to be engaged by a cam 712 carried by the rock shaft 101. Rock shaft 101 also carries a cam 714 which engages an arm 715 connected to a shaft 716 which carries a pair of locking dogs 717 adapted to engage the notched plates 718, thus taking the place of the locking plunger 719 (Fig. 6).

Figure 1:
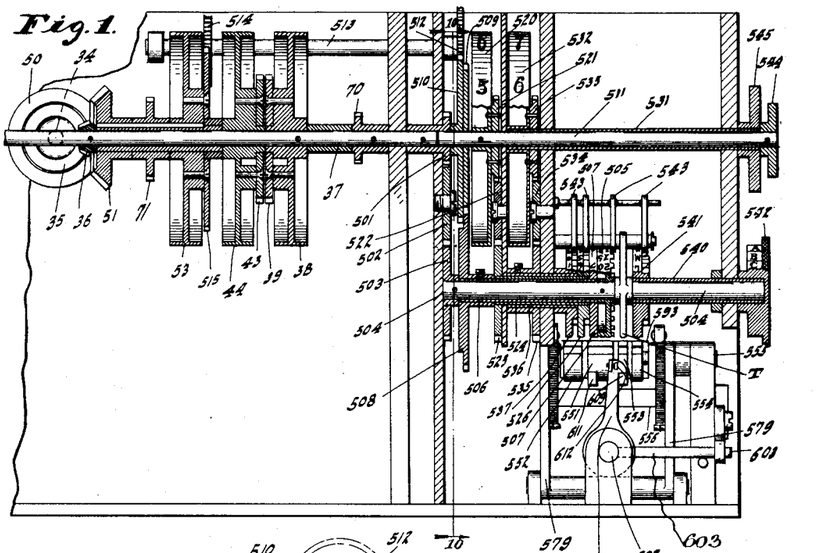
Figure 1 is a sectional detail of the mechanism for producing the special auditor's record already mentioned, the indicating portion of the fare register, constructed substantially as shown in my above mentioned patent, being also shown.
Figure 2:
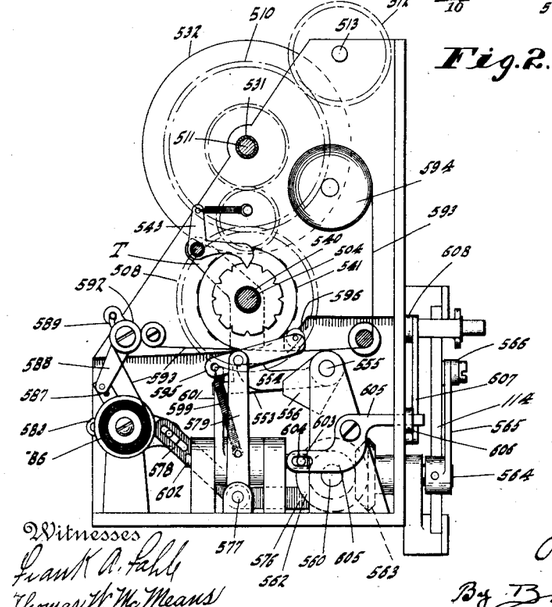
Fig. 2 an end of the parts shown in Fig. 1.
Figure 3:
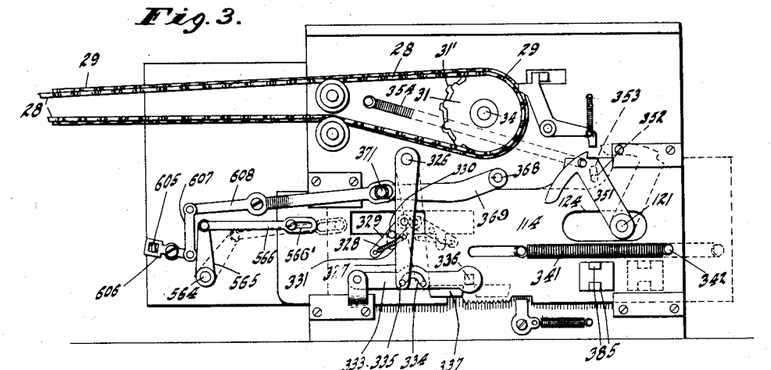
Fig. 3 a rear elevation with the motor omitted.

Instead of the mechanism shown in Fig. 3 for holding arm 327 in either one of its two positions, I provide an arm 327' (Fig. 14) through which is passed a rod 721 connected by a pin and slot connection 722 with an arm 723 carried by the rock shaft 101. The rod 721 passes freely through arm 327' and is provided with a pair of oppositely acting springs 724 and 725 so that arm 327' may be yieldingly urged to either one of its two positions in order to produce a rocking of shaft 326 and a consequent shifting of rod 309.

I claim as my invention:

1. In a fare register, the combination with means for indicating any desired fare and means for accumulating and registering the accumulation of a plurality of such fares, of fare-recording members, intermediate connections between said fare-recording members and the indicating mechanism, collection-point recording members, means for setting said collection-point recording members, conductor-designating recording member, and means for setting said conductor-designating recording member, operating means for actuating the accumulating mechanism in accordance with the setting of the indicating means, and means controlled by said operating means for producing a record from the fare recording members.

2. In a fare register, the combination with fare indicating members, adapted to indicate any desired fare between minimum and maximum, of fare recording members intermediate connections between said fare-indicating mechanism and the fare-recording members for setting the fare recording members in accordance with the fare indicating members, cash fare accumulating mechanism, ticket fare register mechanism, means for selecting the cash fare accumulating mechanism or the ticket fare registering mechanism for actuation in accordance with a setting of the indicating mechanism, a recording designator for ticket fares, collection-point recording members, means for setting said collection-point recording members, a conductor-designating recording member, means for setting said conductor - designating recording member, means coöperating with said recording members for producing a record therefrom, means for interfering with the recording operation of the means coöperating with the ticket-fare designator, an actuating member, and intermediate connections between said actuating member and the several parts for controlling the ticket-fare selecting mechanism and for actuating the several parts.

3. In a fare register, the combination with fare indicating members, adapted to indicate any desired fare between minimum and maximum, of fare recording members, intermediate connections between said fare-indicating mechanism and the fare-recording members for setting the fare recording members in accordance with the fare indicating members, a recording designator for ticket fares, means coöperating with said recording members for producing a record therefrom, means for interfering with the recording operation of the means coöperating with the ticket-fare designator, an actuating member, and intermediate connections between said actuating member and the several parts for controlling the ticket-fare selecting mechanism and for actuating the several parts.

4. In a fare register, the combination with fare indicating members, adapted to indicate any desired fare between minimum and maximum, of fare recording members, intermediate connections between said fare-indicating mechanism and the fare-recording members for setting the fare-recording members in accordance with the fare indicating members, cash fare accumulating mechanism, ticket fare registering mechanism, means for selecting the cash fare accumulating mechanism or the ticket fare registering mechanism for actuation in accordance with a setting of the indicating mechanism, a recording designator for ticket fares, means coöperating with said recording members for producing a record therefrom, means for interfering with the recording operation of the means coöperating with the ticket-fare designator, an actuating member, and intermediate connections between said actuating member and the several parts for controlling the ticket-fare selecting mechanism and for actuating the several parts.

5. In a fare register, the combination with fare indicating members, adapted to indicate any desired fare between minimum and maximum, of fare recording members, intermediate connections between said fare-indicating mechanism and the fare-recording members for setting the fare recording members in accordance with the fare indicating members, a recording designator for ticket fares, collection-point recording members, means for setting said collection-point recording members, a conductor-designating recording member, means for setting said conductor-designating recording member, means coöperating with said recording members for producing a record therefrom, means for interfering with the recording operation of the means coöperating with the ticket-fare designator, an actuating member, and intermediate connections between said actuating member and the several parts for controlling the ticket-fare selecting mechanism and for actuating the several parts.

6. In a fare register, an accumulator therefor comprising a units member, a multi-units member, a units actuator, a multi-units actuator, a gear driven by the units actuator, a clutch member controlled by said gear, a clutch member adapted to coöperate with the first mentioned clutch member and connected to the units indicator, the said units indicator, a gear driven by the multiunits actuator, a clutch member controlled by said last mentioned gear, a clutch member connected to the multiunits indicator and adapted to coöperate with said last mentioned clutch member, the said multiunits indicator, means for simultaneously reciprocating the two actuators, and means controlled by such reciprocation for inter-engaging one pair of clutch members and disengaging the other pair during half of the reciprocation and for automatically reversing the condition of the pairs of clutches upon the return reciprocation.

7. In a fare register, a units actuator and multiunits actuator, means for setting said actuators, means for reciprocating said actuators, an axially shiftable clutch gear 305 meshing with the units actuator, a clutch 303 adapted to be positively engaged by said clutch gear 305, a units indicator connected with said clutch member, an axially shiftable clutch gear 306 meshing with the multi-units actuator, a clutch adapted to be positively engaged by said clutch gear 306, a multiunits indicator connected to said last mentioned clutch, and means controlled by the reciprocation of the actuators for reversing the condition of the pairs of clutches upon reversal of movement of the actuators.

8. In a fare register an actuator member therefor, an air motor connected with the said actuator member, valves for controlling the admission and release of air pressure to said motor, and means within the reach of the conductor for controlling said last mentioned means.

9. The combination with a fare register, of an actuator member therefor, an air motor having a reciprocating piston connected to said actuator member, valves for controlling the admission and exhaust of air pressure to said piston, and means within the reach of the conductor for controlling said valves.

10. In a fare register, the combination of means for registering cash fares and ticket fares, an actuating member, intermediate connections between said actuating member and said cash fare registering means and said ticket fare register means, a selector for connecting either the cash fare registering means or the ticket fare registering means with the actuating member, a motor for driving the actuating member, and means under the control of the conductor for automatically operating the selector and controlling member.

11. In a fare register, an accumulator therefor comprising a units member, a multiunits member, a units actuator, a multiunits actuator, a gear driven by the units actuator, a clutch member controlled by said gear, a clutch member adapted to coöperate with the first mentioned clutch member and connected to the units indicator, the said units indicator, a gear driven by the multiunits actuator, a clutch member controlled by said last mentioned gear, a clutch member connected to the multiunits indicator and adapted to coöperate with said last mentioned clutch member, the said multiunits indicator, a transfer train arranged between the units indicator and the multiunits indicator, said transfer train comprising members for rotating the initial member of the multiunits indicator and for holding said initial member against rotation, a locking member adapted to be projected into position to restrain the units indicator from rotation, means for simultaneously reciprocating the two actuators, and means controlled by such reciprocation for interengaging one pair of clutch members and disengaging the other pair during half the reciprocation and for automatically reversing the condition of the pairs of clutches upon the return reciprocation and for alternating the locked condition of the units indicator and the initial member of the multiunits indicator.

12. In a register, the combination, with means for setting said register to register a particular item, and a power motor operated by power supplied from an external source to actuate said register to cause it to register said item, of a single manually operated means operable at a point removed from the register and within reach of the operator for controlling both said setting means and the supply of power to said power motor.

13. In a register, the combination, with means for setting said register, and means for actuating the same, of a power driven motor operated by power supplied from an external source and operatively connected to said actuating means, and a device operable at a point removed from the register and within reach of the operator for actuating said setting means and for controlling the supply of power to said power driven motor.

14. In a register, the combination, with means for setting said register, means for actuating the same, and a frame supporting said parts, of a fluid pressure cylinder mounted within said frame and operatively connected to said actuating means, a valve for controlling the admission of fluid to said cylinder, and means operable from a point removed from said register and within the reach of the operator for both controlling said valve and actuating said setting means.

15. In a register, the combination, with a slide bar for actuating said register, of a fluid pressure cylinder having a piston and a piston rod, said piston rod being arranged substantially parallel with said slide bar and rigidly connected thereto, a valve controlling the admission of the fluid to said cylinder, and means under the control of the operator for actuating said valve.

16. In a register, the combination, with a main frame comprising end members, means for setting said register, an actuating bar slidably mounted in said frame, a fluid pressure cylinder rigidly secured to said frame between said end members, a piston and a piston rod for said cylinder, said piston rod being operatively connected to said slide bar, and means within the reach of the operator for controlling the flow of fluid to said cylinder and for actuating said setting means.

17. In a register, the combination, with means for actuating said register, a power driven mechanism operatively connected to said actuating means, and means for controlling said power driven mechanism, of a reciprocatory member, means for operatively connecting said reciprocatory member to said controlling means to positively actuate the same, and means for imparting reciprocatory movement to said member.

18. In a register, the combination, with means for setting said register, and operating mechanism for the same, of a fluid pressure cylinder operatively connected to said operating mechanism, and means for connecting said fluid pressure cylinder to the compressed air receptacle of an air-brake system of a car, and means for controlling the admission of the air to said cylinder and for actuating said setting means.

19. In a register, the combination, with means for setting said register, and means for actuating the same, of a fluid pressure cylinder operatively connected with said actuating means, a valve for controlling the admission of fluid to said cylinder, and a single manually operated device for controlling said setting means and for positively actuating said valve.

20. The combination, with a car, and an air-brake system therefor, of a fare register, mounted on said car, means for setting said register, means to actuate the same, a fluid pressure operated device operatively connected to said actuating means, a connection between said device and said air-brake system, and means arranged to be operated by the conductor from a single position to control said device and to operate said setting means.

21. The combination, with a car, and an air-brake system therefor, a fare register mounted on said car, means for setting said register, means to actuate the same, a fluid pressure operating device operatively connected to said actuating means, a connection between said device and said air brake system, a valve to control the passage of air from said system to said device, and a single device to actuate said valve and said setting means.

22. In a register, the combination, with means for actuating said register, a fluid pressure cylinder operatively connected to said actuating means, and a valve for controlling the admission of fluid to said cylinder, of a member capable of a reciprocatory movement, a lever operatively connected to said reciprocatory member, means for operatively connecting said lever to said valve to positively actuate the same, and means for imparting a reciprocatory movement to said member.

23. In a register, the combination, with means for setting said register, and means for actuating the same, of a fluid pressure cylinder operatively connected with said actuating means, a valve for controlling the admission of fluid to said cylinder, and a single manually operated device for controlling said setting means and for positively actuating said valve.

24. In a register, the combination, with means for setting said register, and means for actuating said register, of a fluid pressure device operatively connected to said actuating means, a valve for controlling the admission of fluid to said fluid pressure device, and means operable from a point removed from said register and within reach of the operator for both controlling said valve and actuating said setting means.

25. In a register, the combination of means for setting said register, a slidably mounted actuating bar, a fluid pressure cylinder, a piston and piston rod for said cylinder, said piston rod being operatively connected to said actuating bar, and means operable from a point removed from the register and within the reach of the operator for controlling the flow of fluid to said cylinder and for actuating said setting means.

26. In a fare register, an actuator member therefor, a fluid pressure motor spring-pressed in one direction and movable in the other by fluid pressure, said motor being connected with said actuator member, valve means for controlling the admission and release of fluid pressure to said motor to operate it against or allow it to be operated by its spring, and means within the reach of the operator for controlling said valve means.

27. The combination, with a fare register, of an actuator member therefor, a fluid pressure motor having a reciprocating piston which is spring-pressed in one direction and is operable in the other against its spring by fluid pressure, said piston being connected to said actuator member to operate the latter, valve means for controlling the admission and exhaust of fluid pressure to said piston to operate it against or allow it to be operated by its spring, and means within the reach of the operator for controlling said valve means.

28. The combination, with a fare register, of an actuator member therefor, a fluid pressure motor connected with such actuator member, valve means for controlling the supply of fluid pressure to said fluid pressure motor, and means operable from a point removed from the register and within the reach of the operator for controlling said valve means.

In witness whereof, I have hereunto set my hand and seal, at Indianapolis, Indiana, this 2nd day of September, A. D. one thousand nine hundred and nine.

OTTO N. MOORE. [L. S.]

Witnesses:
  ARTHUR M. HOOD,
  THOMAS W. MCMEANS.